July 21, 1936.  R. R. WEBBER  2,048,580

VEHICLE

Filed Aug. 20, 1934

Inventor

Ray R. Webber,

By Ruess & Geier

Attorneys

Patented July 21, 1936

2,048,580

UNITED STATES PATENT OFFICE 2,048,580

VEHICLE

Ray R. Webber, Cleveland, Ohio, assignor of one-third to William Sullivan, Cleveland, Ohio Application August 20, 1934, Serial No. 740,681

5 Claims. (Cl. 214—38)

This invention relates to improvements in vehicles and particularly to trucks or trailers used in transporting freight or merchandise, which latter has been stored in containers.

The primary important object of this invention is to provide a vehicle of the above character which is particularly adapted for handling merchandise packed in containers, the latter forming the entire load or a unit thereof.

Another important object of this invention is to provide a vehicle of the above character in which the load provides a closure for the bottom of the vehicle or a portion thereof.

Another important object of this invention is to provide a vehicle of the above character having a top, sides and an open body which is adapted to be backed over a load, the latter forming the bottom wall of the vehicle.

A further important object of this invention is to provide a vehicle of the above character in which the load is stored and transported with a minimum of effort upon the part of the user.

A still further object of this invention is to provide a vehicle of the above character which is of simple construction, efficient in use and one which may be manufactured at a reasonable cost.

Figure 1:
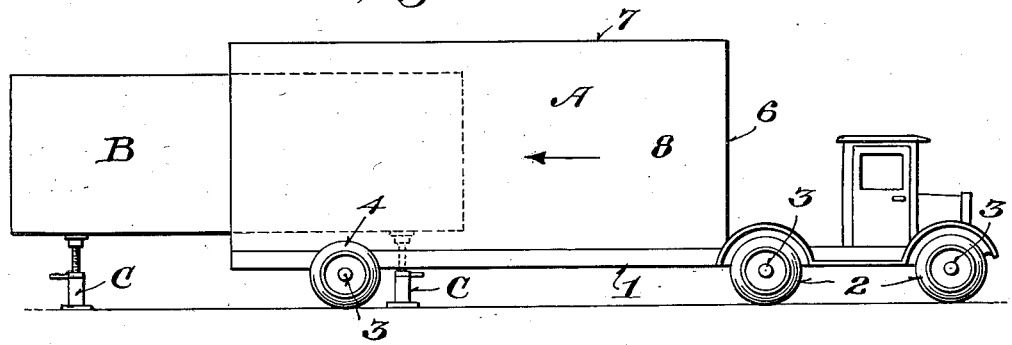
Figure 2:
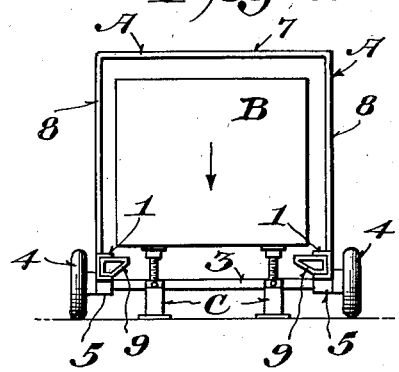
Figure 4:
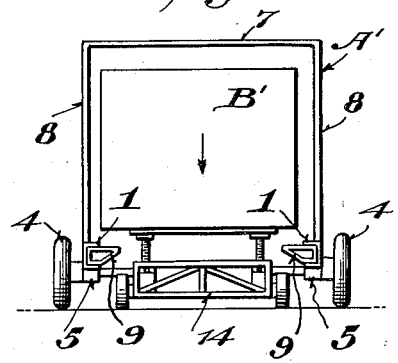
Figure 3:
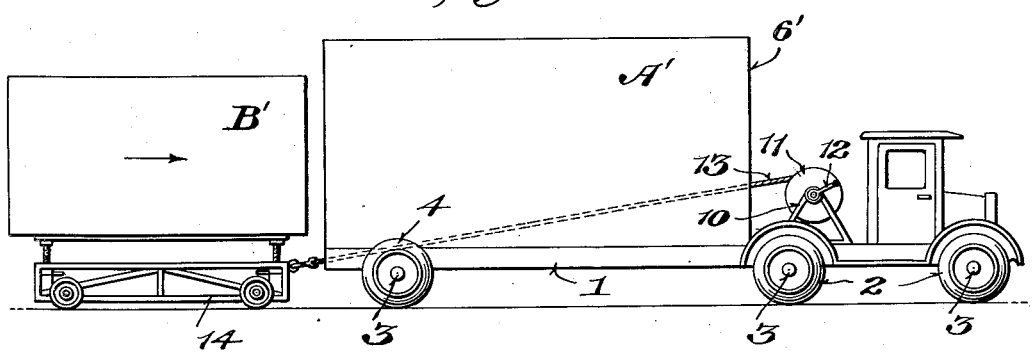

These and other objects and advantages will be apparent from the following description and accompanying drawing in which, Figure 1 is a side elevation of the vehicle showing the latter partially backed over a loaded container, Figure 2 is an end elevation of Figure 1, Figure 3 is a modified form of the invention as disclosed in Figure 1 in which the loaded container is being moved into the vehicle, and Figure 4 is an end elevation of the modified form of the invention as disclosed in Figure 3.

Referring in detail to the drawing, A indicates generally a vehicle having a chassis 1 of substantially U-shaped construction when viewed in plan, thus providing front and side rails and having an open rear end. The chassis 1 is supported at its adjacent forward end upon the usual ground engaging wheels 2, opposed pairs of which are connected by axles 3 extending transversely across the chassis. The rear of the chassis adjacent the open end thereof is supported upon each side thereof by ground engaging wheels 4 having stub axles received in sleeves 5, the latter constituting bearings for the stub axles. Mounted upon the chassis and extending from the rear end of the latter to a point spaced from the forward end of the chassis is a body 6 having a top 7 and side walls 8.

Mounted along each of the inner side faces of the chassis 1 along each of the sides thereof is an inwardly extending flange or support 9 secured to the chassis in any suitable manner. It is to be particularly noted that the inner longitudinal edges of the flanges 9 terminate only a slight distance beyond the inner side faces of the chassis.

It will be seen from the foregoing that a vehicle is provided which has a closed top and sides, and is further provided with an open rear end and bottom, the latter being defined by the inner opposed edges of the longitudinally extending flanges 9.

In order to load a vehicle constructed in accordance with the foregoing description, a container B of substantially rectangular formation is elevated above the ground by means of the usual load elevating jacks C to a point slightly above the upper faces of the longitudinal flanges 9. Whereupon, the vehicle A is backed over the container B in the direction of the arrow as shown in Fig. 1, until the vehicle has completely enclosed the container B whereupon the latter is lowered by means of the jacks C until same engages and is supported along each side by the longitudinal flanges 9. The jacks are then removed and the load is in a position to be transported.

In the modification of the invention as disclosed in Figs. 3 and 4 the vehicle A' is of the same general construction as disclosed in Figs. 1 and 2, with the addition, however, of a frame 10 carried upon the chassis forwardly of the front end of the vehicle body 6'. The frame 10 is adapted to support a cable drum 11 having the usual operating handle 12, disposed about the drum 11 is a cable 13, the free end of which passes longitudinally through the vehicle from the front to the rear thereof and is connected to the forward end of a wheeled elevating truck 14 of any suitable construction, the latter being adapted to elevate and support a loaded container B'.

In the operation of the modified form of the invention as disclosed in Figs. 3 and 4 the load B' is elevated to a point above the longitudinally extending supporting flanges, whereupon the free end of the cable 13 is connected to the front of the truck and the drum is then turned in a direction to move the elevating truck 14 with its accompanying load into the vehicle A' whereupon the elevating truck is actuated to lower the load until the latter rests upon the longitudinally extending supporting flanges. As in the case of the invention described in Figs. 1 and 2 the jacks are removed and the load is then ready for transportation.

It is to be particularly noted that with the construction disclosed in the various figures of the drawing and the method of loading the vehicle, a loaded container may be placed at any desired point in the vehicle so as to properly equalize the load and balance the vehicle.

When the load arrives at its destination the operation of elevating the load and moving the vehicle away from same is reversed.

In the novel form of the invention disclosed it is to be further particularly noted that a portion of the loaded container provides an entire or partial closure for the transporting vehicle, depending upon the length of the container being transported.

It is to be expressly understood that various modifications of the invention may be resorted to within the spirit and scope of the invention as announced by the following claims, the various forms of the invention herein described being merely by way of illustration and are not to be considered as an exhaustive enumeration of all ways by which the invention may be practiced.

What is claimed is:

1. The herein described method of transporting containers and the like, which resides in elevating the container to a predetermined distance above the ground by exerting force against the bottom of the container at points intermediate the container sides, then in positioning a medium of transportation relative to the container so as to enclose the elevating media and the sides of the container, and finally in lowering the container onto the medium in transporting relation to the transporting medium.

2. A vehicle of the type set forth including load elevating means, a vehicle having traction means and having a load support on each side thereof, the distance between the said supports being less than the width of the load and there being free space between said supports so that upon relative movement between the vehicle and the load the said supports will lie below the bottom of the load and project inwardly of the sides thereof and be enclosed by the sides of the vehicle whereby upon lowering of the load the latter will directly seat upon the supports, and the bottom of the load will thereby form the bottom of the vehicle.

3. The herein described method of transporting containers and the like which resides in initially elevating the container to a predetermined position above the ground by exerting force against the bottom of the container at points intermediate the sides thereof, then in positioning supports beneath the bottom of the container on opposite sides of the latter and outwardly of the elevating media, lowering the container into engagement with the supports and finally in imparting tractive force to the supports to transport the container to its destination.

4. A vehicle in accordance with claim 2, wherein the body has means for pulling the container thereinto in elevated position of the latter.

5. A vehicle in accordance with claim 2, wherein the body has pulling means for moving the container thereinto, which pulling means consists of a cable which operates through the ends of the body, a drum on which the cable is wound and means to rotate the drum.

RAY R. WEBBER.